Feb. 4, 1936.   K. BREDTSCHNEIDER   2,029,606
HIGH PRESSURE JOINT FOR PRESSURE VESSELS
Filed June 18, 1932
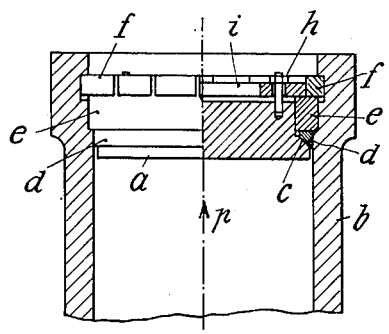
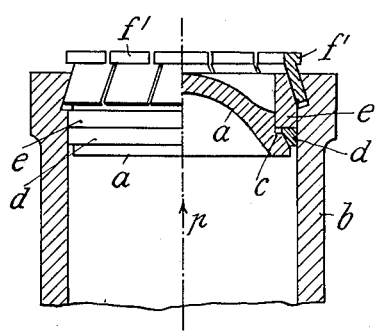
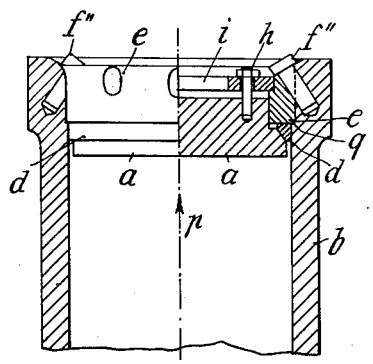
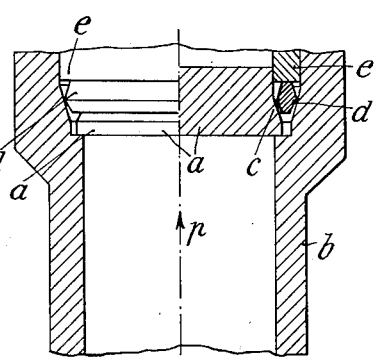
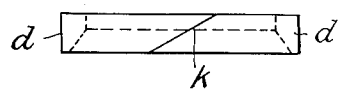
Inventor:
Kurt Bredtschneider
by Karl Leichauer
Atty.

Patented Feb. 4, 1936

2,029,606

UNITED STATES PATENT OFFICE 2,029,606

HIGH PRESSURE JOINT FOR PRESSURE VESSELS

Kurt Bredtschneider, Dortmund, Germany

Application June 18, 1932, Serial No. 618,005
In Germany June 24, 1927

7 Claims. (Cl. 220—3)

My invention relates to a high pressure joint for pressure vessels, and more particularly to improved means for sealing a cover by means of a gasket, arranged to produce an absolutely airtight closure joint between the said cover and the peripheral wall of the vessel.

In general, means for utilizing the inner pressure of a pressure vessel for the sealing pupose are in themselves universally known. Most of the means heretofore employed for the purpose, however, are objectionable for the reason that it is very difficult to open the closed vessel, that is to remove the cover therefrom, because the packing material employed for the sealing purpose is forced by the cover into the gap between the wall of the vessel and the abutment members fixed therein, in the manner of a stuffing-box so as to form an obstacle which does not give up the expansion power stored up therein, even not after the inner pressure has been removed, and renders it very difficult to remove the cover. In other types of hermetic closures screw joints, bayonet joints and similar connecting means are provided which must be opened or disengaged in order to allow of removing the cover and comparatively much time and work are required for accomplishing such disengagement, due to friction at a great leverage.

The above-stated disadvantages are the reason why, at the present state of the art, automatic closures of the described kind have not met with any important degree of practical success and particularly in case of high-pressure vessels used in the chemical industry aversion to closures of the described kind prevails.

The object of my invention is to remedy these defects and to provide an automatic hermetic closure for pressure vessels which will be free from all of the disadvantages hitherto experienced in connection with automatic hermetic seals, and which moreover will be highly insensible to the influences of rise and fall of temperature. Just this latter peculiarity of my improved automatic sealing means involves the possibility of and enables a ready disengagement of the cover of the vessel and, therefore, constitutes a marked feature of my invention, the more so since the usefulness of the vessel will be greatly enhanced and the life of the vessel and cover prolonged thereby.

With the above recited object in view the present invention resides, viewed from its broadest aspect, in the provision of a comparatively thin elastic packing ring or gasket which is inserted into the vessel so as to engage an abutment member adapted to be readily mounted in and dismounted from the vessel, and to be expanded by the pressure existing in the vessel by way of wedge action in order to be forced against the wall of the vessel for the sealing purpose.

This gasket or ring possesses a very high modulus of elasticity.

In known locking or sealing devices of a similar kind gasket or packing rings have been used which consisted of a material which, being either made of copper or of rubber or any other material, is by nature so soft, that it is stressed beyond its elastic limit to produce a perfectly tight joint. It follows hence, that it must be enclosed all around in order to prevent its being squeezed out through any possible gaps, in which case a perfect joint would be impossible.

In the new locking device the invention employs neither soft nor any of the other materials used for packing purposes up till now.

The new ring being made of a material which possesses a very much higher modulus of elasticity than copper is stressed only within its elastic limit. It is not squeezed together at all; that is, there is substantially no flow of metal so that provision can be made for ample clearance between the locking cover of the wall of the vessel and the holding ring.

In contradistinction to the soft metal rings (copper rings) hitherto suggested for this purpose I employ rings or gaskets made of welding iron, cast steel or steel alloys such as spring steel, silicon steel or nickel steel. The moduli of elasticity of these metals are as follows: welding iron 30,000,000; silicon steel 30,000,000; spring steel 29,000,000; nickel steel 30,000,000; cast steel 31,000,000. In contradistinction thereto the coefficient for cold copper is only 15,000,000 and for copper at 400° C. only 9,300,000.

Having thus set forth in general the principle upon which my invention depends and having shown the particular improvements or advantages effected over the prior art, I shall now particularly describe a few simple embodiments thereof which I have shown diagrammatically in the accompanying drawing for the purpose of more fully disclosing my invention; but it is to be understood that such diagrams show only a few of the numerous possible embodiments of my invention which I have successfully used in practice, and that I do not limit myself thereto inasmuch as many modifications may be devised by those skilled in the art without departing from the spirit of my invention.

In the accompanying drawing forming a part of this specification and wherein like reference symbols designate like parts throughout the several views:

Fig. 1 is a view in vertical section of a portion of the upper end of a pressure vessel with the closing cover and the sealing means according to my invention;

Fig. 2 is a similar view of a modification thereof;

Fig. 3 is a similar view of another modification;

Fig. 4 is a similar view of a further modification, and

Fig. 5 is an elevation of a gasket of a preferred constructional form for use in connection with the closure shown.

In all of the embodiments shown in the drawing a resilient metallic gasket $d$ of the highly elastic kind above described is provided for the sealing purpose, properly speaking. The cover $a$ is forced outwards due to the pressure existing in the vessel $b$ when in use and indicated by the arrow $p$, so as to cause its conical face $c$ to intimately engage and act upon the gasket $d$ whereby the latter will be expanded or sprung outwardly without permanent deformation and forced with its vertical face or periphery against the peripheral wall of the vessel. The follower provided for sustaining the pressure exerted by the gasket in vertical direction is shaped to form an annular member or ring $e$ of a diameter corresponding substantially to the inner diameter of the vessel $b$. The follower ring $e$ in turn abuts against and is kept in place by an abutment member or members $f$ adapted to be fixed in or to the wall of the vessel in various ways as will be explained hereinafter more in detail. It will be seen that the abutment members $f$, for instance in the embodiment illustrated in Fig. 1, are subjected to shearing stresses under or by the pressure present in the vessel when in use. The follower and the abutment member or members serve as means for retaining the gasket in position.

In the embodiment shown in Fig. 1 the follower ring $e$ is kept in place by a number of abutment segments $f$ which are of like shape and size. The segments $f$ are partially embedded or accommodated in an annular groove provided for the purpose in the inner surface of the wall of the vessel near the top edge thereof.

In the modification illustrated in Fig. 2 a conical ring composed of a plurality of abutment segments or sections $f'$ is employed for securing the follower ring $e$ in place. The several sections $f'$ are partially housed or encased in a conical groove shaped to conform to the contour of the conical ring or sections which are adapted to be inserted into the groove or removed therefrom prior to and after use, repectively, by moving or manipulating them in a slanting direction with respect to the top face of the vessel.

Fig. 3 illustrates a modification which is capable of being manufactured in the shop to an utmost degree of accuracy. After the insertion of the follower ring $e$ preferably so as to engage and rest upon a shoulder $g$ provided on the inner surface of the vessel $b$ a number of screw-holes are drilled each at the same time both in the ring $e$ and in the inner surface of the vessel $b$, so that the axis of the hole will lie at an angle to the axis of the vessel, as will be readily understood on inspection of Fig. 3. It goes without mentioning that the holes are equally spaced apart from each other as is usual in shop work of this kind, and that the thread required for the reception of the screws $f''$ is to be cut in the holes in the usual manner.

When the parts including the cover $a$, the gasket $d$ and the follower ring $e$ are duly assembled, the abutment bolts $f''$ while being subjected to shearing stresses, will act to transmit the pressure imparted to the cover $a$ to the peripheral wall of the vessel.

In the modification shown in Fig. 4 the gasket $d$ has been given a shape or sectional contour which is somewhat different from that of the embodiments illustrated in Figs. 1 to 3. Instead of a substantially triangular sectional area as in Figs. 1 to 3 the gasket shown in Fig. 4 is of substantially quadrangular cross-section and is enclosed in the annular chamber formed by the wall of the vessel, the slanting face $c$ of the cover $a$ and the follower ring $e$, in a manner that three angles or edges thereof will be in contact with the surfaces of the vessel, the ring and the cover whereby a so-called linear seal or line contact is produced.

The gasket shown in Fig. 5 is a split ring and somewhat similar to an obliquely slit piston ring. This construction of the gasket will increase the resiliency and consequently the sealing efficiency thereof. In practice it will be advisable to apply several such gaskets and mount the same in the annular chamber in succession one above the other one and with the oblique slits $k$ offset or in staggered relationship, or alternatively, to employ a single gasket of the form shown in Fig. 5, of a slightly greater diameter than the inner diameter of the vessel and which is to be inserted into the vessel upon having been given a certain tension according to the diametrical difference between the ring and the vessel, so that the slit $k$ will close tight due to the pressure in the vessel.

The screw bolts $h$ shown in Figs. 1 and 3 serve the purpose of securing the cover $a$, the gasket $d$, and the follower ring $e$ in their assembled condition by means of a ring $i$, so that the assembled parts will form a unit prior to and ready for insertion. At the same time the gasket $d$ may be compressed thereby a little in order to exert a preliminary or initial sealing action prior to the development of the inner pressure $p$.

In view of the foregoing a detailed description of the operation of the improved hermetic closure is deemed unnecessary and is, therefore, omitted in the interest of brevity. Nor does it seem necessary to burden this specification with an exposition of the advantages which the invention possesses, for they will be apparent to those skilled in the art to which this invention relates.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

The present application is a continuation in part of Ser. No. 287,260.

I claim:—

1. A closure for pressure vessels comprising a thin elastic ferrous metal packing ring having a modulus of elasticity of the order of 30,000,000, being provided with an internal wedge section and being adapted to be temporarily sprung outwardly without permanent deformation upon the application of pressure against said wedge section, closure means exposed to the internal pressure of said vessel provided with an external wedge section cooperating with said internal wedge section of said packing ring adapted to press against said packing ring upon rise of pressure within said vessel and to thereby spring said ring against the wall of said vessel in the manner stated and follower means for retaining said packing ring between said cooperating wedge sections.

2. A closure for pressure vessels comprising a cover provided with a peripheral wedge section fitting loosely in the mouth of said vessel, a thin, elastic gasket of hard metal having a modulus of elasticity of the order of 30,000,000 positioned between said peripheral wedge section and the wall of said vessel, and means for holding said gasket in said position; the said gasket being adapted to be temporarily expanded outwardly by said wedge section without being stressed beyond its elastic limit and substantially without flow of metal upon increase of pressure within said vessel thereby producing a tight seal for said vessel.

3. The closure of claim 2 wherein said gasket is made of a ferrous metal selected from a group consisting of welding iron, spring steel, cast steel, silicon steel and nickel steel.

4. The closure of claim 2 wherein said gasket is provided with a wedge section cooperating with the peripheral wedge section of said cover.

5. The closure of claim 2 wherein said gasket is provided with a wedge section and a split ring.

6. The closure of claim 2 wherein the space between said peripheral wedge section and the wall of said vessel, and the shape of said gasket are such as to provide at least one substantially line contact seal.

7. The closure of claim 2 wherein the gasket is substantially quadrangular in cross section and wherein the shape of the space between said peripheral wedge section and the wall of said vessel and the shape of said gasket are such as to provide two substantially line contact seals.

KURT BREDTSCHNEIDER.